Oct. 8, 1968  R. L. JAESCHKE ETAL  3,404,761
PLANETARY HYDRAULIC COUPLING
Filed July 20, 1966  3 Sheets-Sheet 1

Ralph L. Jaeschke,
John H. Wolcott,
Inventors.
Koenig, Senniger, Powers and Leavitt,
Attorneys.

Oct. 8, 1968  R. L. JAESCHKE ET AL  3,404,761

PLANETARY HYDRAULIC COUPLING

Filed July 20, 1966  3 Sheets-Sheet 3

United States Patent Office 3,404,761
Patented Oct. 8, 1968

3,404,761
PLANETARY HYDRAULIC COUPLING
Ralph L. Jaeschke and John H. Wolcott, Kenosha, Wis., assignors to Eaton Yale & Towne, Inc., Cleveland, Ohio, a corporation of Ohio
Filed July 20, 1966, Ser. No. 566,626
3 Claims. (Cl. 192—61)

ABSTRACT OF THE DISCLOSURE

A drive shaft rotates a casing forming an internally tapered liquid container. Attached internally within the large end of the casing is a retainer for a planetary geartrain. A driven shaft extends into the small end of the casing and into the retainer where it carries a sun gear of the planetary train. Planet gears mesh with the sun gear to form planetary gear pumps. Radial inlet ports in the gear retainer having permanently unobstructed entries convey liquid inwardly to the gear pumps. Fluid flows from the pumps through retainer delivery ports and then through an axially disposed movable control valve. The valve directs flow to radially disposed outlet ports in the retainer. The valve is operative under flow pressure variably to control the flow and therefore to control the speed ratio between the shafts. The pressure is controlled by an axially movable ring for variably throttling the outlet ports. The inlet edges of the delievery ports are beveled to aid suppression of noise by effecting gradual pressure release from the pumps. Noise is further suppressed by having the number of sun-gear teeth such that when divided by the number of planet gears a whole number does not result. An interiorly unobstructed, cup-shaped flaring baffle is attached at its closed end to and rotates concentrically with the retainer for driving the fluid under centrifugal force to the small end of the casing for return under centrifugal force to the radial inlet ports of the gear retainer.

---

Among the several objects of the invention may be noted the provision of a coupling of this class which is comparatively cool and quiet in operation. Other objects and features will be in part apparent and in part pointed out hereinafter.

The invention accordingly comprises the construction hereinafter described, the scope of the invention being indicated in the following claims.

In the accompanying drawings in which one of various possible embodiments of the invention is illustrated, FIG. 1 is an axial section of a coupling made according to the invention;

Corresponding reference characters indicate corresponding parts throughout the several views of the drawings.

Figure 1:
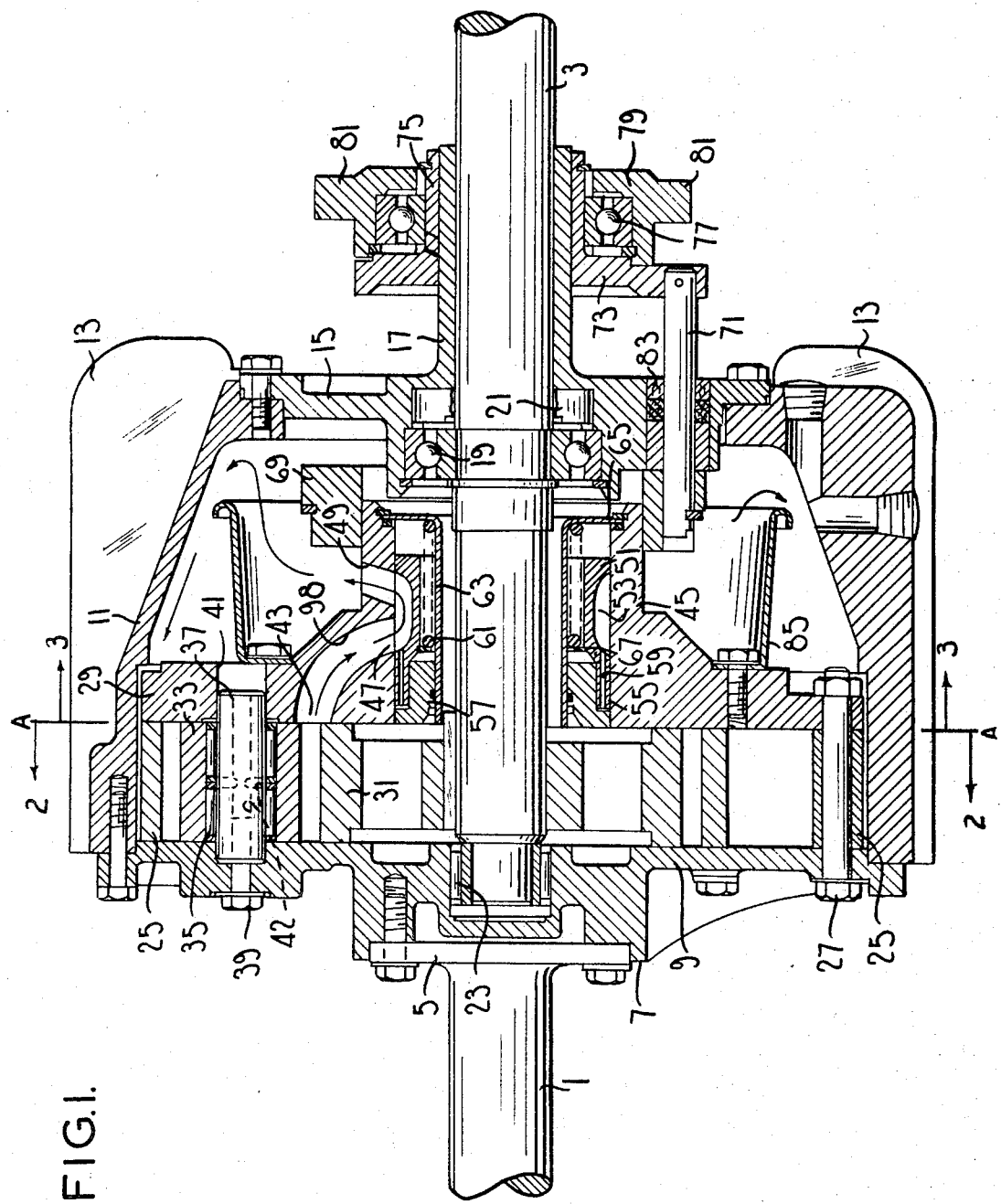

The invention is an improvement upon hydraulic clutches of the general class shown, for example but without limitation, in U.S. Patents 2,329,230, 2,658,595 and 2,669,332. In general such a clutch forms a driving connection between an essentially constant-speed drive means such as an electric motor or the like, and a load which is to be driven at a selected one of various possible speeds. Overheating and noisy operation of this planetary class of coupling are substantially minimized.

Referring to the drawings, there is shown at numeral 1 a drive shaft, driven from a substantially constant-speed driver, such as a constant-speed motor (not shown). At numeral 3 is shown a driven shaft which is connected to the load to be driven (not shown). The resisting torque of shaft 3 may vary over a range of values according to the load and the driver is of sufficient capacity to overcome such torque at any value in the torque range of the load.

The drive shaft 1 is flanged at 5 by means of which it is bolted to the hub 7 of a first end plate 9. The plate 9 is bolted to a housing 11 provided with cooling fins 13. Housing 11 including its fins is preferably composed of aluminum for good heat transfer from the hydraulic fluid which is to be contained therein. Bolted to the right-hand end of the housing 11 is a second end plate 15, formed with an outwardly extending sleeve 17 through which extends the shaft 3. A bearing 19 is provided in the end plate 15 for supporting shaft 3. A suitable packing ring 21 is provided adjacent the bearing. The left-hand end of the driven shaft 3 is supported within a pilot bearing 23 in the hub 7 of the end plate 9. Plates 9, 15 and the housing 11 form a container for hydraulic liquid, which may also be referred to as a casing.

At numeral 25 is shown a gear holder which is clamped between the end plate 9 and a manifold plate 29. Clamping bolts such as 27 are used for the purpose. Only one of these bolts appears in the plane of the section of FIG. 1. The end plate 9, manifold 29 and holder 25 form a gear retainer diven along with the housing 11 by shaft 1. Keyed to the driven shaft 3 and located within the gear holder 25 is a sun gear 31. Meshed with the sun gear 31 and located in the holder 25 are three planetary gears 33. Other numbers of these may be employed but three are preferable. Only one of these appears in the plane of the section of FIG. 1. Gears 33 are carried on needle bearings 35 located around hollow supporting pins 37 extending between the end plate 9 and the manifold 29. Each pin 37 is held by a bolt 39 extending through plate 9 and threaded axially into the respective pin 37. The other end of each pin extends into an opening 41 through the manifold 29. Each pin is drilled as shown at 42 for supplying lubrication to the bearings 35.

In the manifold 29 are three ports 43, each of which extends from a region on the face of the manifold where the teeth of a planetary gear 33 mesh with the sun gear 31. The inlet to each port 43 is sloped as shown at 97. Each port 43 is curved and terminates radially inward at an outlet 47 within a sleeve 45 which forms a part of the manifold 29. The sides of ports converge along their curved portions, as shown at 98. Adjacent each outlet 47 in sleeve 45 is another outlet 49. There are three pairs of outlets 47, 49, only one pair of which appears in the plane of the FIG. 1 section.

Within the sleeve 45 is a speed-compensating spool valve 51 grooved as shown at 53 movable to connect and disconnect each pair of outlets 47 and 49. The valve 51 is formed with an extending sleeve 55 which slides between an inner ring 57 and the cylindrical inside of the manifold 29 and its extension 45. Holes 59 extend axially through the sleeve 55 so that any pressure communicated to the groove 53 will in turn be communicated to the left end of the sleeve 55, thus by reaction tending to drive the spool to the right. This driving action is resisted by a coil return spring 61 carried in a sleeve 63. The sleeve 63 by means of a flange 65 is attached at the right by suitable means to the manifold sleeve 45. The spring 61 reacts between the flange 65 and a flange formed by a holding ring 67 located on the inside of the spool 51.

On the cylindrical outside surface of the sleeve 45 is a manually operable and slidable valve ring 69 to which are fastened three pillar bolts 71. One bolt appears in the plane of FIG. 1. These bolts 71 extend to and are fastened to the flange 73 of a control sleeve 75, the latter being movable on sleeve 17 on end plate 15. A suitable bearing 77 around sleeve 75 supports a control ring 79 on which are gudgeons 81. A suitable manually operable fork control (not shown) connected with the gudgeons 81 controls the axial position of parts 79, 75, bolts 71 and the valve ring 69. Suitable packing means 83 is employed around each bolt 71 within the end plate 15.

The purpose of the valve ring 69 is to move across the outlet ports 49 to throttle them variably. The purpose of the valve formed by spool valve 51 is to throttle outlet ports 47 variably. The curved dart on FIG. 1 illustrates the flow of oil or other hydraulic fluid, a charge of which is carried in the housing 11. Bolted to the manifold 29 is a cup-shaped baffle 85 for causing fluid from ports 49 to follow a long path on the inside of housing 11 during circulation. This provides time for adequate cooling and defrothing of the fluid. Centrifugal force engendered by rotation of the parts connected to shaft 1 causes flow on the inside of the housing to the left and to the gear retainer, then from it into the cup 85, then to the right through the cup and returning at the right to the inside of housing 11, as shown by the darts.

Figure 2:
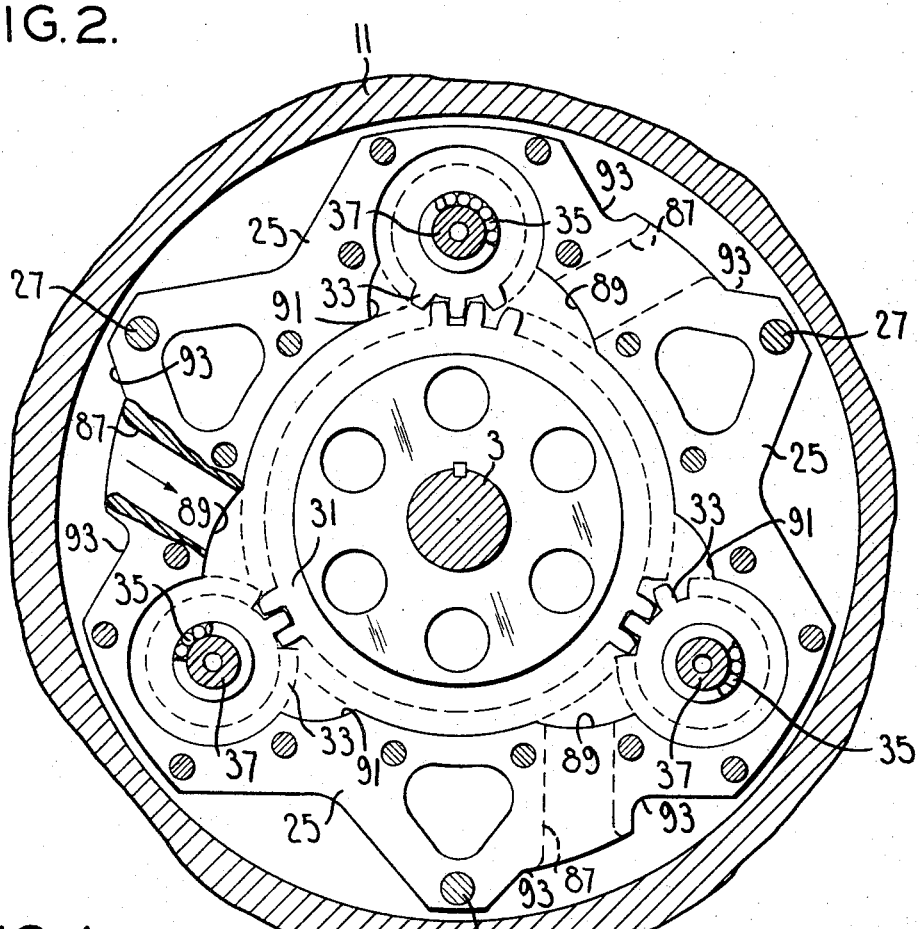
FIG. 2 is a cross section on line A—A of FIG. 1, as viewed in the direction 2—2, parts being broken away.
Figure 3:
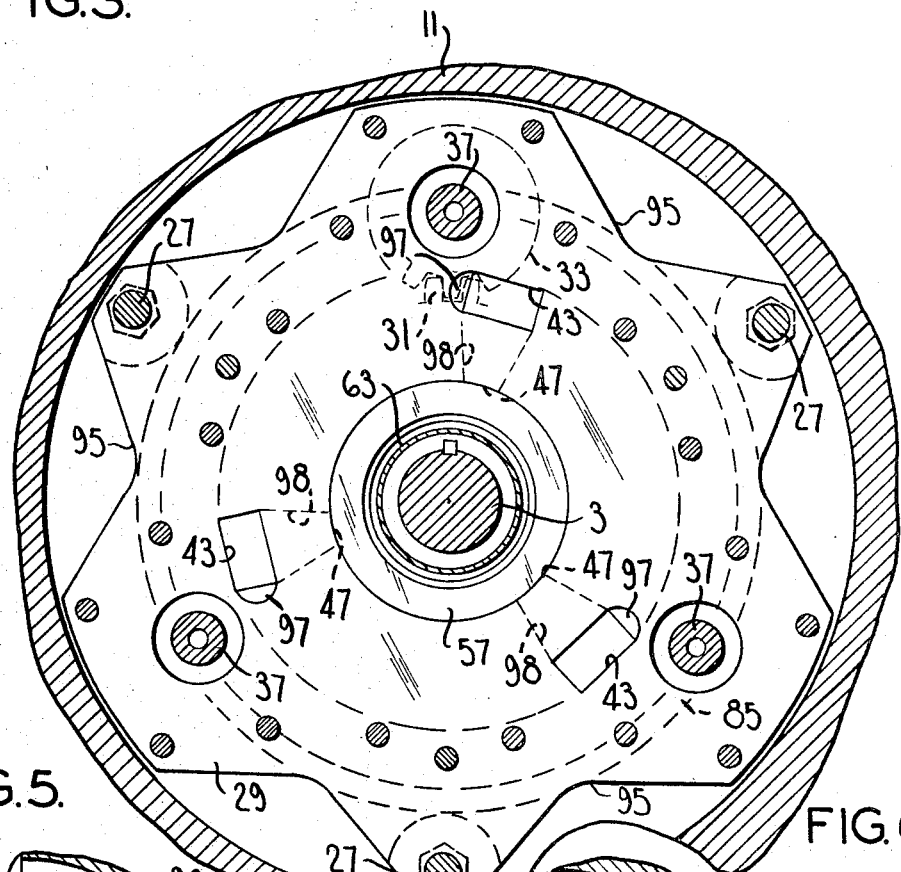
FIG. 3 is a cross section on line A—A of FIG. 1, as viewed in the direction 3—3.

Referring to FIG. 2, there are three radial ports 87 in the gear holder 25. These extend to recessed portions 89. Recesses 89 form oil inlet spaces adjacent to meshing regions between teeth of the sun gear 31 and planetary gears 33. Outlet spaces 91 adjacent these meshing regions communicate with the above-mentioned outlet ports 43. The inlets of the ports 87 are located in notched-out portions 93 of the gear holder 25 to provide for free flow of oil to these inlets. As will be seen from FIG. 3, the periphery of the manifold 29 is also provided with notched portions 95 for freely conveying oil to these inlets.

Figure 4:
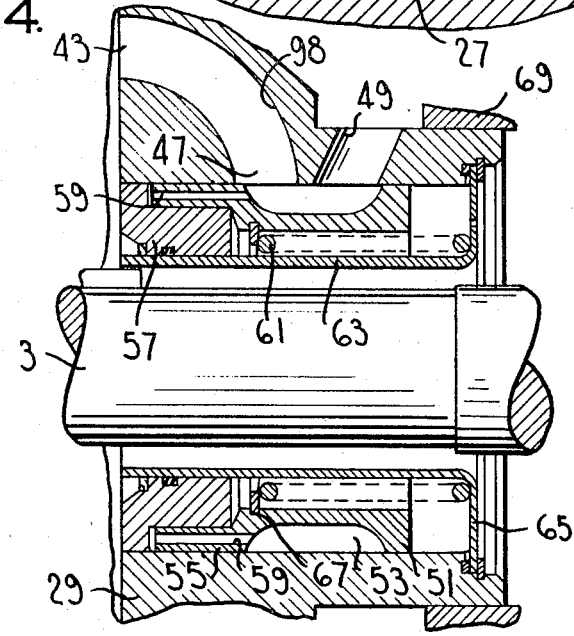
FIG. 4 is an enlarged view of certain compensating valve parts in minimum-speed positions.
Figure 5:
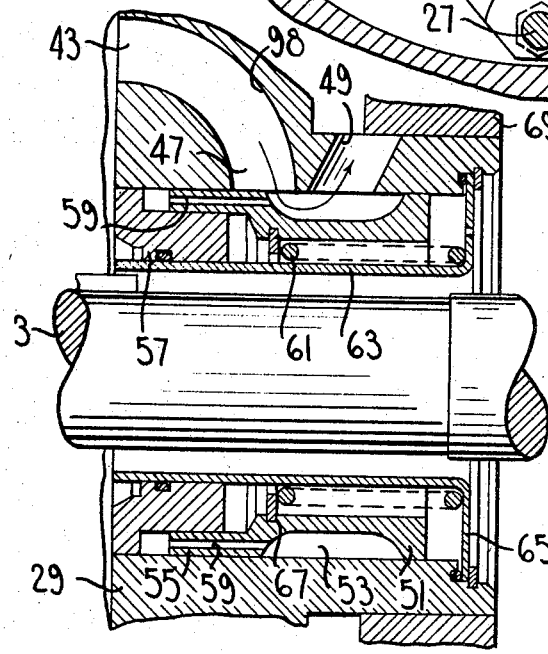
FIG. 5 is a view similar to FIG. 4 but showing said valve parts in intermediate-speed positions.
Figure 6:
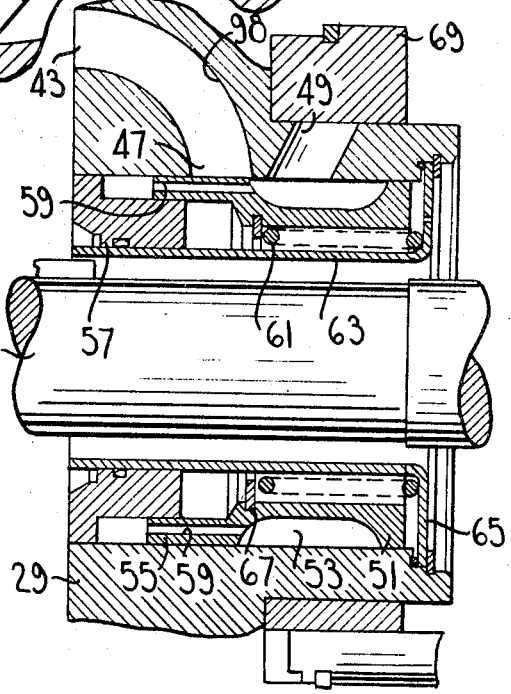
FIG. 6 is a view similar to FIG. 4 showing said valve parts in maximum-speed positions.

Referring to FIGS. 4–6, operation is as follows, assuming that a charge of hydraulic fluid such as oil is carried in the casing 11, that there is a load on shaft 3 which supplies resisting torque, and that the ring 69 is moved to the right as shown in FIG. 4. In this case the planetary gears 33 will roll freely on the sun gear 31, acting as gear pumps to draw oil in from spaces 89 and discharging it under pressure into spaces 91. Fluid from spaces 91 circulates through passages 43, 47, 53, 49, housing 11, 87 and back to spaces 89. In the FIG. 4 position of parts, restrictions to oil flow are at a minimum and the speed drop or slip-speed between shafts 1 and 3 is at a maximum. When shaft 3 is loaded its speed will be zero.

To pick up the load, valve ring 69 is shifted to the left (FIG. 5), so as partially to cover the outlet ports 49. This increases the back pressure in the passages 43, 47, 53, 49 which is communicated through the holes 59 to the left end of the spool valve 51, thus tending to shift it to the right. The resulting throttling of fluid from the planetary gear pumps constituted by planetary gears 33 meshing with gear 31 causes resistance to rotation of gears 33 on the pins 37, with resulting transmission of torque to gear 31 and therefore to the loaded shaft 3. The slip-speed (or speed drop between shafts 1 and 3) and the fluid flow rate are substantially directly proportioal. Therefore in order to maintain a substantially constant slip-speed it is only necessary to maintain a substantially constant flow rate. This is accomplished by regulatory action of the spool valve 51. Assume for example that the load increases. The speed of shaft 3 will then incipiently decrease, thus incipiently increasing the slip-speed (speed of shaft 1 substantially constant). This incipiently increases the flow rate with increase of pressure in the groove 53 of spool 51. This pressure increase exerted through openings 59 incipiently moves the spool 51 to the right against the resilient action of spring 61. This in turn incipiently reduces the flow rate. Thus a substantially constant slip-speed is maintained under variable loading on shaft 3.

For reduction in load at a given setting of the ring 69 over ports 49 (as in FIG. 5) a converse action would occur. Thus initially the slip-speed would tend to decrease with resulting acceleration of shaft 3 (speed of shaft 1 constant). This in turn would reduce the pressure in groove 53 of spool valve 51, allowing spring 61 incipiently to move the spool to the left, thereby increasing the flow through passages 43, 47 and 49 and increasing the slip-speed which would result in a correction in the speed of shaft 3 to maintain it substantially constant.

Thus with a small amount of hunting of valve 51 around a mean position, the initial slip-speed is substantially maintained under varying load, with a resulting substantially constant speed of shaft 3. Hunting action is minimal because the spool valve 51 is radially balanced by surrounding pressure in groove 53. This minimizes the axial force required to move it and makes its operation more sensitive than otherwise.

FIG. 6 illustrates the setting of valve ring 69 for maximum speed of shaft 3 corresponding to substantially zero slip-speed. In this case the resulting maximum pressure established in groove 53 of the compensating valve 51 and acting through holes 59 drives it to the right. The speeds of shafts 1 and 3 will then be substantially constant and substantially equal to that of the constant-speed driver for shaft 1.

It is desirable to reduce the noise level in apparatus of this class. One cause of such noise is excessively rapid release of oil pressure from between the teeth of the gears acting as gear pumps. The resulting pulsations are a prolific cause of noise. In order to minimize the rapidity of pressure release, the inlet ends of ports 43 are bevelled as shown at 97, and they are tapered inwardly as shown at 98, starting at their largest portions at the meshing regions of gears 33 and sun gears 31. The resulting gradual relief of this pressure substantially reduces noise.

Another factor in producing noise is that each planetary gear 33 will effect a number $n$ of compression pulses per rolling revolution thereof on the sun gear 31, where $n$ represents the number of the teeth in the sun gear. If $n$ is integrally divisible by three, all of the pulsations caused by the three planetary gears will be in phase and the pulses will be of high amplitude with resulting substantial noise at the frequency $n$. If $n$ is not divisible by three to form a whole number, then the pulsations will be out of phase. Thus the amplitudes of the pulses are smaller. Moreover, there will be a frequency of pulses equal to three times the number of teeth on the sun gear. The higher number of pulses at lower amplitudes produce less noise. If the number of planetary gears such as 33 is other than three, then the excluded divisor equals their number.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. The hydraulic coupling comprising an interiorly tapered liquid-containing casing, an attached gear retainer in the large end of the casing for rotation therewith, a drive shaft connected with large end of the casing, a sun gear in the retainer, a driven shaft extending into the small end of the casing and connected with the sun gear, a number of planet gears mounted in the retainer and meshing with the sun gear to form gear pumps for the liquid, radially disposed liquid inlets having permanently unobstructed entries in the retainer and extending inwardly to the pumps respectively, liquid delivery conduits in the retainer extending from the pumps, an axially movable pressure-responsive valve with which said delivery conduits are connected for liquid flow control through the conduits, outlet port means in the retainer for said valve, a movable control member for throttling said outlet port means for varying said pressure, an open-ended cup-shaped baffle attached at its closed end to said retainer and rotatable therewith for receiving liquid from the outlet port means of the valve and to direct the liquid axially away from said retainer through its open end to the small end of the casing to be centrifugally driven back by rotation of the casing to the unobstructed radial inlet ports of the retainer, thereby to cool the liquid while minimizing frothing thereof.

2. The coupling according to claim 1, wherein said liquid delivery conduits in the retainer have beveled inlet edges, and the number of teeth on the sun gear is such that when divided by the number of planet gears a whole number does not result.

3. The coupling according to claim 2, wherein the inside of the baffle is unobstructed and flares from said retainer toward the small end of the casing to exert a centrifugally induced axial force on liquid flow therethrough.

References Cited

UNITED STATES PATENTS

| | | | |
|---|---|---|---|
| 2,311,237 | 2/1943 | Loveday | 192—61 |
| 1,954,418 | 4/1934 | Ley | 192—61 |
| 2,540,659 | 2/1951 | Del Mar | 192—61 |
| 2,645,903 | 7/1953 | Elkins | 192—61 |
| 3,275,114 | 9/1966 | Thomas | 192—61 |

MARTIN P. SCHWADRON, *Primary Examiner.*

C. M. LEEDOM, *Assistant Examiner.*